US012645229B2

(12) United States Patent
Winward et al.

(10) Patent No.: US 12,645,229 B2
(45) Date of Patent: Jun. 2, 2026

(54) DISTRIBUTED INTERSECTION MANAGEMENT

(71) Applicant: Autonomous Solutions, Inc., Mendon, UT (US)

(72) Inventors: Garrett Winward, Mendon, UT (US); Nathan Merkley, Mendon, UT (US); Daniel Morwood, Mendon, UT (US); Benjamin Call, Mendon, UT (US); Jeff Ferrin, Mendon, UT (US)

(73) Assignee: Autonomous Solutions, Inc., Mendon, UT (US)

( * ) Notice: Subject to any disclaimer, the term of this patent is extended or adjusted under 35 U.S.C. 154(b) by 71 days.

(21) Appl. No.: 18/923,229

(22) Filed: Oct. 22, 2024

(65) Prior Publication Data

US 2025/0130595 A1        Apr. 24, 2025

Related U.S. Application Data

(60) Provisional application No. 63/592,566, filed on Oct. 23, 2023.

(51) Int. Cl.
| | |
|---|---|
| *G05D 1/693* | (2024.01) |
| *A01B 69/04* | (2006.01) |
| *A01B 79/00* | (2006.01) |
| *G05D 1/698* | (2024.01) |
| *G05D 107/20* | (2024.01) |
| *G05D 107/70* | (2024.01) |

(52) U.S. Cl.
CPC ........... *G05D 1/693* (2024.01); *A01B 69/008* (2013.01); *A01B 79/00* (2013.01); *G05D*

*1/6983* (2024.01); *G05D 2107/21* (2024.01); *G05D 2107/70* (2024.01)

(58) Field of Classification Search
CPC .... G05D 1/693; G05D 1/6983; A01B 69/008; A01B 79/00
See application file for complete search history.

(56) References Cited

U.S. PATENT DOCUMENTS

| | | | |
|---|---|---|---|
| 9,528,838 | B2 | 12/2016 | Okumura |
| 2002/0082806 | A1* | 6/2002 | Kaub ...................... G08G 1/164 |
| | | | 702/182 |
| 2013/0304279 | A1 | 11/2013 | Mudalige et al. |
| 2014/0278029 | A1 | 9/2014 | Tonguz et al. |
| 2019/0146513 | A1* | 5/2019 | Tomita .................. B60W 30/10 |
| | | | 701/50 |
| 2020/0341466 | A1 | 10/2020 | Pham et al. |
| 2021/0061269 | A1* | 3/2021 | Petroff ............ B60W 30/18159 |
| 2021/0082296 | A1 | 3/2021 | Jacobus et al. |
| 2021/0101599 | A1* | 4/2021 | Pendleton ......... B60W 60/0027 |

FOREIGN PATENT DOCUMENTS

JP         2022530091 A        6/2022

* cited by examiner

*Primary Examiner* — Tan Q Nguyen

(57) ABSTRACT

Systems and methods for determining the order of autonomous vehicles proceeding through the intersection locally by the autonomous vehicles are disclosed. The method may include determining the presence of overlapping regions between paths of different autonomous vehicles. The method may also include assigning one of the autonomous vehicles as the authority to decide which autonomous vehicle should proceed through the intersection before all other autonomous vehicles.

20 Claims, 4 Drawing Sheets

400

405

410 — Processor(s)

425 — Storage Device(s)

415 — Input Device(s)

420 — Output Device(s)

430 — Communications Subsystem

Working Memory

Operating System — 440

435

Application(s) — 445

DISTRIBUTED INTERSECTION MANAGEMENT

BACKGROUND

An autonomous vehicle may follow a path through an external environment along a path. The autonomous vehicle may sense the external environment for any obstacles (e.g., regions of the path that may overlap with the path of another vehicle) that may exist along the path. Typically, when such an obstacle is found on the path, the autonomous vehicle is programmed to stop or reduce in speed until the obstacle is no longer present or an updated path can be created.

SUMMARY

Methods and systems are disclosed for controlling an autonomous vehicle on a first path proximate to an intersection. A method, for example, may include detecting a neighboring autonomous vehicle on a second path proximate to the intersection; identifying a first overlapping region between the first path and the second path; communicating the first overlapping region identified by the autonomous vehicle to the neighboring autonomous vehicle; receiving a second overlapping region between the first path and the second path identified by the neighboring autonomous vehicle; comparing the first overlapping region and the second overlapping region to determine whether the first overlapping region matches the second overlapping region; being identified with a first priority identifier, where if the first priority identifier has greater priority over a second priority identifier assigned to the neighboring autonomous vehicle, being designated as an authority to decide whether the autonomous vehicle or the neighboring autonomous vehicle proceeds through the intersection first in a first decision and communicating the first decision to the neighboring autonomous vehicle or if the first priority identifier has lesser priority over the second priority identifier assigned to the neighboring autonomous vehicle, receiving a second decision from the neighboring autonomous vehicle as to whether the autonomous vehicle or the neighboring autonomous vehicle proceeds through the intersection first; and in response to the first decision or the second decision, operating the autonomous vehicle to proceed through the intersection or yield to the neighboring autonomous vehicle proceeding through the intersection. The first priority identifier may be a first numerical priority identifier and the second priority identifier may be a second numerical priority identifier. If the first numerical priority identifier is less than the second numerical priority identifier, the first numerical priority identifier may have greater priority over the second numerical priority identifier. If the first numerical priority identifier is greater than the second numerical priority identifier, the first numerical priority identifier may have lesser priority over the first numerical priority identifier. The method may also include receiving data from the neighboring autonomous vehicle, such as position, orientation, velocity, and second path of the neighboring autonomous vehicle.

An autonomous vehicle on a first path proximate to an intersection is also disclosed that may include a sensor array that produces sensor data; a transceiver that communicates with and receives data from a neighboring autonomous vehicle on a second path proximate to the intersection; a speed control system that controls the speed of the autonomous vehicle; a steering control system that controls the steering of the autonomous vehicle; and a controller communicatively coupled with the sensor array, the transceiver, and the speed control system. The controller may have code that detects a neighboring autonomous vehicle on a second path proximate to the intersection via the sensor array; identifies a first overlapping region between the first path and the second path; communicates the first overlapping region identified by the autonomous vehicle to the neighboring autonomous vehicle via the transceiver; receives a second overlapping region between the first path and the second path identified by the neighboring autonomous vehicle via the transceiver; compares the first overlapping region and the second overlapping region to determine whether the first overlapping region matches the second overlapping region; receives a first priority identifier, where if the first priority identifier has greater priority over a second priority identifier assigned to the neighboring autonomous vehicle, designates as an authority to decide whether the autonomous vehicle or the neighboring autonomous vehicle proceeds through the intersection first in a first decision and communicates the first decision to the neighboring autonomous vehicle, or if the first priority identifier has lesser priority over the second priority identifier assigned to the neighboring autonomous vehicle, receives a second decision from the neighboring autonomous vehicle as to whether the autonomous vehicle or the neighboring autonomous vehicle proceeds through the intersection first; and in response to the first decision or the second decision, sends commands to the steering control system and the speed control system that when executed move the autonomous vehicle to proceed through the intersection or yield to the neighboring autonomous vehicle proceeding through the intersection.

The various embodiments described in the summary and this document are provided not to limit or define the disclosure or the scope of the claims.

DETAILED DESCRIPTION

Figure 1:
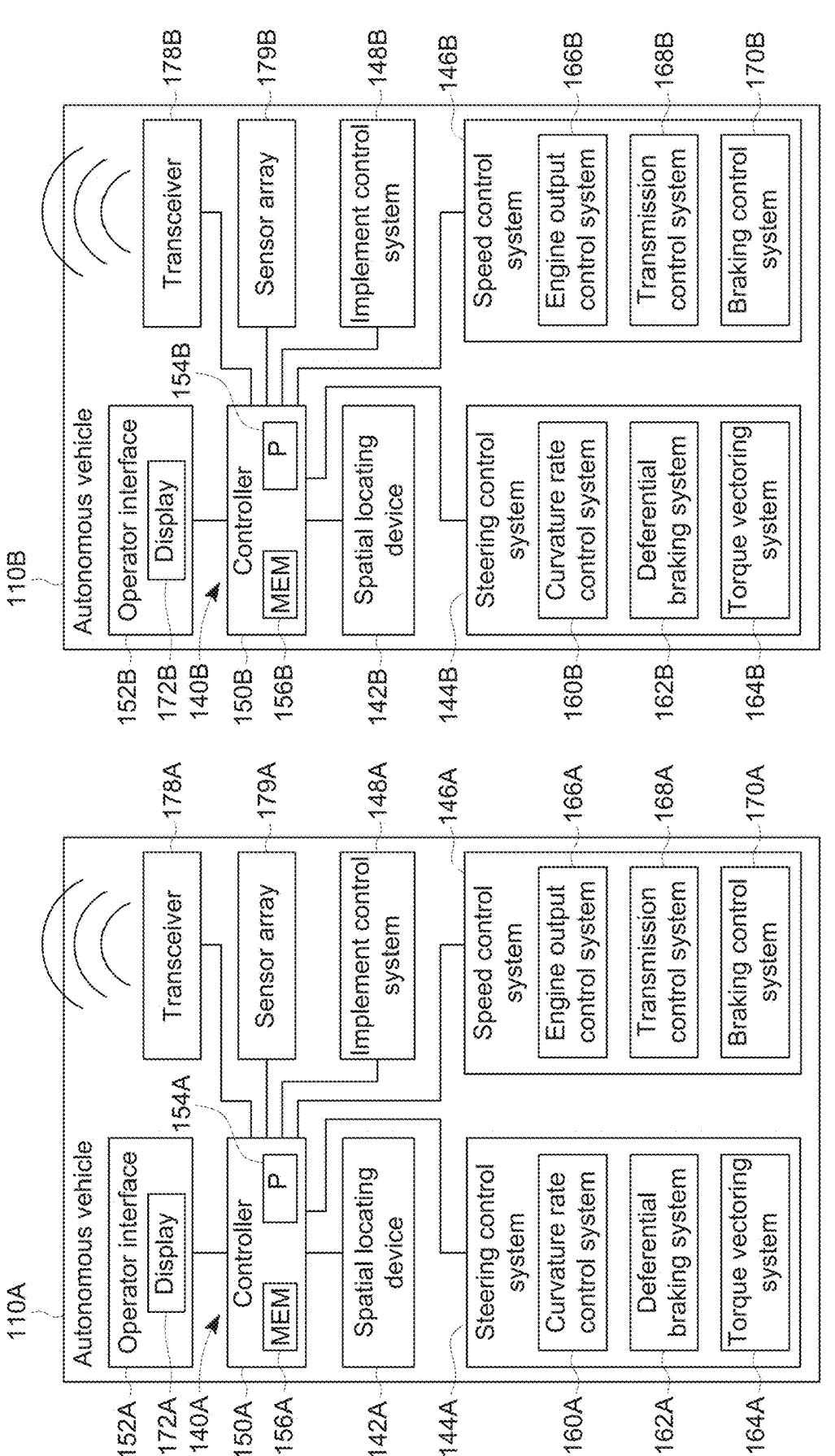
FIG. 1 is a block diagrams of two autonomous vehicles in communication.

An autonomous vehicle system and method are disclosed that allow autonomous vehicles proximate to an intersection to make decisions locally on the order of autonomous vehicles proceeding through the intersection (e.g., which autonomous vehicle proceeds through the intersection first, second, third, etc.). Autonomous vehicles proximate to an intersection may have different algorithms or protocols guiding their decision-making process. The disclosed system and method provide an efficient decision-making process for autonomous vehicles proximate to an intersection that may reconcile potential conflicting decisions arrived at by autonomous vehicles having different algorithms or protocols.

Autonomous vehicles, for example, may include an obstacle detection and avoidance subsystem that detects obstacles or overlapping regions along the paths of autonomous vehicles and determines which of the autonomous vehicles should proceed through the intersection to prevent paths from overlapping. Autonomous vehicles, for example, may detect and communicate with each other to provide information on, for example, their position, orientation, velocity, planned path, and calculated overlapping region(s) of the paths of the autonomous vehicles proximate to the intersection. Autonomous vehicles, for example, may compare the calculated overlapping region(s) to confirm they match as a measure to ensure that overlapping region(s) are correctly identified. Overlapping region(s), for example, may be treated as obstacles that autonomous vehicles should avoid. Once obstacle(s) or overlapping region(s) among autonomous vehicle(s) have been identified, the obstacle avoidance subsystem in some autonomous vehicles may guide such autonomous vehicles to either avoid the obstacle(s) or overlapping region(s) or reduce the speed and stop the autonomous vehicle(s).

The disclosed system and method, for example, may allow the designation of one autonomous vehicle as the authority of all autonomous vehicles proximate to an intersection. The authority may be tasked with the responsibility of deciding the order of vehicles proceeding through the intersection (e.g., which vehicle proceed through the intersection first, second, third, etc.) and communicating the decision to all other autonomous vehicles. All other autonomous vehicles that are not designated as the authority may receive the decision on the order of vehicles proceeding through the intersection (e.g., which of the autonomous vehicles will proceed through the intersection first, second, third, etc.). The autonomous vehicle selected to proceed through the intersection before another autonomous vehicle (e.g., first) may cease treating overlapping region(s) as obstacles and proceed through the overlapping region and/or the intersection while other autonomous vehicles may stop or reduce their speed to allow the selected autonomous vehicle to proceed through the intersection. One possible benefit of the disclosed system and method may, for example, eliminate or reduce the use of a central arbiter (or command and control system) that decides the order of autonomous vehicles for proceeding through the intersection, which may conserve resource usage.

For example, a priority identifier may be assigned to each autonomous vehicle when an autonomous vehicle becomes known at a work site (e.g., when autonomous vehicle management software is installed or downloaded onto or implemented by the autonomous vehicle, when the autonomous vehicle management software recognizes the autonomous vehicle which may or may not be implementing the intersection management system, when the autonomous vehicle is manufactured, when the autonomous vehicle is delivered to a customer, or when the autonomous vehicle is delivered to work site etc.). For example, the priority identifier may be statically assigned to each autonomous vehicle once the autonomous vehicle is part of the autonomous vehicle management software or introduced to a work site. A statically assigned priority identifier may be used to indefinitely identify the autonomous vehicle (e.g., a statically assigned priority identifier for an autonomous vehicle does not change). Each autonomous vehicle, for example, known at the work site may have a unique priority identifier (e.g., no autonomous vehicle has the same priority identifier). Each autonomous vehicle known at the work site may have a comparable priority identifier (e.g., all autonomous vehicles known at the work site may have a priority identifier that is in the same category of priority identifiers, such as all autonomous vehicles have numerical priority identifiers). The priority identifier may be numerical, alphabetical, alphanumeric, or other priority identifiers that can be used to signify priority.

FIG. 1 is a block diagram of autonomous vehicles 110A and 110B. Autonomous vehicle 110A may be in communication with neighboring autonomous vehicle 110B when they are near an intersection. An intersection may be a junction where two or roads converge, diverge, meet, or cross, for example, at the same height or grade. An intersection may involve any number of road segments or any number of streets crossing at one junction, such as 3, 4, 6, 5, 7, etc. For example, a three-way intersection is a junction between three road segments, a four-way intersection is a junction of four road segments or two streets, a six-way intersection is a junction of six road segments or three streets, etc. An intersection may be a roundabout, t-shaped, y-shaped, cross-shaped, or merging intersection. Intersections may be uncontrolled intersections without signs or signals, yield-controlled intersections with or without specific yield signs, stop-controlled intersections with one or more stop signs, or signal-controlled intersections with traffic signals.

The autonomous vehicle 110A, 110B, for example, may include an automobile, a truck, a van, an electric vehicle, a combustion vehicle, a loader, a wheel loader, a track loader, a dump truck, a digger, a backhoe, a forklift, etc. Various components of the autonomous vehicles 110A, 110B, for example, may include any or all components of computational system 400 shown in FIG. 4.

The autonomous vehicles 110A, 110B, for example, may include a steering control system 144A, 144B that may control the direction of movement of the autonomous vehicles 110A, 110B. The steering control system 144A, 144B, for example, may include any or all components of computational system 400 shown in FIG. 4.

The autonomous vehicle 110A, 110B, for example, may include a speed control system 146A, 146B that controls a speed of the autonomous vehicle 110A, 110B. The autonomous vehicle 110A, 110B, for example, may include an implement control system 148A, 148B that may control the operation of an implement coupled with or towed by the autonomous vehicle 110A, 110B or integrated within the autonomous vehicle 110A, 110B. The implement control system 148A, 148B, for example, may include any type of implement such as, for example, a bucket, a shovel, a blade, a thumb, a dump bed, a plow, an auger, a trencher, a scraper, a broom, a hammer, a grapple, forks, boom, spears, a cutter, a wrist, a tiller, a rake, etc. The speed control system 146A, 146B, for example, may include any or all components of computational system 400 shown in FIG. 4.

The control system 140A, 140B, for example, may include a controller 150A, 150A communicatively coupled to the steering control system 144A, 144B, the speed control system 146A, 146B, and the implement control system 148A, 148B. The control system 140A, 140B, for example, may be integrated into a single control system. The control system 140A, 140B, for example, may include a plurality of distinct control systems. The control system 140A, 140B, for example, may include any or all the components of computational system 400 shown in FIG. 4.

The controller 150A, 150B, for example, may receive signals relative to many parameters of interest including, but not limited to: vehicle position, vehicle speed, vehicle heading, desired path location, off-path normal error, desired off-path normal error, heading error, vehicle state vector information, curvature state vector information, turning radius limits, steering angle, steering angle limits, steering rate limits, curvature, curvature rate, rate of curvature limits, roll, pitch, rotational rates, acceleration, and the like, or any combination thereof.

The controller 150A, 150B, for example, may be an electronic controller with electrical circuitry configured to process data from the various components of the autonomous vehicle 110A, 110B. The controller 150A, 150B may include a processor, such as the processor 154A, 154B, and a memory device 156A, 156B. The controller 150A, 150B may also include one or more storage devices and/or other suitable components (not shown). The processor 154A, 154B may be used to execute software, such as software for calculating drivable path plans. Moreover, the processor 154A, 154B may include multiple microprocessors, one or more "general-purpose" microprocessors, one or more special-purpose microprocessors, and/or one or more application specific integrated circuits (ASICS), or any combination thereof. For example, the processor 154A, 154B may include one or more reduced instruction set (RISC) processors. The controller 150A, 150B, for example, may include any or all the components of computational system 400 shown in FIG. 4.

The controller 150A, 150B may be in communication with a spatial locating device 142A, 142B such as, for example, a GPS device. The spatial locating device 142A, 142B may provide geolocation data to the controller 150A, 150B.

The memory device 156A, 156B, for example, may include a volatile memory, such as random access memory (RAM), and/or a nonvolatile memory, such as ROM. The memory device 156A, 156B may store a variety of information and may be used for various purposes. For example, the memory device 156A, 156B may store processor-executable instructions (e.g., firmware or software) for the processor 154A, 154B to execute, such as instructions for calculating drivable path plan, and/or controlling the autonomous vehicle 110A, 110B. The memory device 156A, 156B may include flash memory, one or more hard drives, or any other suitable optical, magnetic, or solid-state storage medium, or a combination thereof. The memory device 156A, 156B may store data such as field maps, maps of desired paths, vehicle characteristics, software or firmware instructions and/or any other suitable data.

The steering control system 144A, 144B, for example, may include a curvature rate control system 160A, 160B, a differential braking system 162A, 162B, a steering mechanism, and a torque vectoring system 164A, 164B that may be used to steer the autonomous vehicle 110A, 110B. The curvature rate control system 160A, 160B, for example, may control a direction of an autonomous vehicle 110A, 110B by controlling a steering control system of the autonomous vehicle 110A, 110B with a curvature rate, such as an Ackerman style autonomous loader, 110A, 110B or articulating loader. The curvature rate control system 160A, 160B, for example, may automatically rotate one or more wheels or tracks of the autonomous vehicle 110A, 110B via hydraulic or electric actuators to steer the autonomous vehicle 110A, 110B. For example, the curvature rate control system 160A, 160B may rotate front wheels/tracks, rear wheels/tracks, and/or intermediate wheels/tracks of the autonomous vehicle 110A, 110B or articulate the frame of the loader, either individually or in groups. The differential braking system 162A, 162B may independently vary the braking force on each lateral side of the autonomous vehicle 110A, 110B to direct the autonomous vehicle 110A, 110B. Similarly, the torque vectoring system 164A, 164B may differentially apply torque from the engine to the wheels and/or tracks on each lateral side of the autonomous vehicle 110A, 110B. While the steering control system 144A, 144B includes the curvature rate control system 160A, 160B, the differential braking system 162A, 162B, and/or the torque vectoring system 164A, 164B. A steering control system 144A, 144B, for example, may include other and/or additional systems to facilitate turning the autonomous vehicle 110A, 110B such as an articulated steering control system, a differential drive system, and the like.

The speed control system 146A, 146B, for example, may include an engine output control system 166A, 166B, a transmission control system 168A, 168B, and a braking control system 170A, 170B. The engine output control system 166A, 166B may vary the output of the engine to control the speed of the autonomous vehicle 110A, 110B. For example, the engine output control system 166A, 166B may vary a throttle setting of the engine, a fuel/air mixture of the engine, a timing of the engine, and/or other suitable engine parameters to control engine output. In addition, the transmission control system 168A, 168B may adjust gear selection within a transmission to control the speed of the autonomous vehicle 110A, 110B. Furthermore, the braking control system 170A, 170B may adjust braking force to control the speed of the autonomous vehicle 110A, 110B. While the illustrated speed control system 146A, 146B includes the engine output control system 166A, 166B, the transmission control system 168A, 168B, and/or the braking control system 170A, 170B. A speed control system 146A, 146B, for example, having other and/or additional systems to facilitate adjusting the speed of the autonomous vehicle 110A, 110B may be included.

The implement control system 148A, 148B, for example, may control various parameters of the implement towed by and/or integrated within the autonomous vehicle 110A, 110B. For example, the implement control system 148A, 148B may instruct an implement controller via a communication link, such as a CAN bus, ISOBUS, Ethernet, wireless communications, and/or Broad R Reach type Automotive Ethernet, etc.

The implement control system 148A, 148B, for example, may instruct an implement controller to adjust a penetration depth of at least one ground engaging tool of an agricultural implement, which may reduce the draft load on the autonomous vehicle 110A, 110B.

The implement control system 148A, 148B, as another example, may instruct the implement controller to transition an agricultural implement between a working position and a transport portion, to adjust a flow rate of product from the agricultural implement, to adjust a position of a header of the agricultural implement (e.g., a harvester, etc.), among other operations, etc.

The implement control system 148A, 148B, as another example, may instruct the implement controller to adjust a shovel height, a shovel angle, a shovel position, etc.

The implement control system 148A, 148B, as another example, may instruct the implement controller to adjust a shovel height, a shovel angle, a shovel position, etc.

The controller 150A, 150B, for example, may be coupled with a sensor array 179A, 179B. The sensor array 179A, 179B, for example, may facilitate determination of condition(s) of the autonomous vehicle 110A, 110B and/or the work area. For example, the sensor array 179A, 179B may include one or more sensors (e.g., infrared sensors, ultrasonic sensor, magnetic sensors, radar sensors, Lidar sensors, terahertz sensors, sonar sensors, cameras, etc.) that monitor a rotation rate of a respective wheel or track and/or a ground speed of the autonomous vehicle 110A, 110B. The sensors may also monitor operating levels (e.g., temperature, fuel level, etc.) of the autonomous vehicle 110A, 110B. Furthermore, the sensors may monitor conditions in and around the work area, such as temperature, weather, wind speed, humidity, and other conditions. The sensors, for example, may detect physical objects in the work area, such as the parking stall, the material stall, accessories, other vehicles, other obstacles, or other object(s) that may be in the area surrounding the autonomous vehicle 110A, 110B. Further, the sensor array 179A, 179B may be utilized by the obstacle detection system.

The operator interface 152A, 152B, for example, may be communicatively coupled to the controller 150A, 150B and configured to present data from the autonomous vehicle 110 or autonomous vehicle 110B, respectfully. Display data may include data associated with the operation of the autonomous vehicle 110A, 110B, data associated with the operation of an implement, a position of the autonomous vehicle 110A, 110B, a speed of the autonomous vehicle 110A, 110B, a desired path, a drivable path plan, a target position, a current position, etc. The operator interface 152A, 152B may enable an operator to control certain functions of the autonomous vehicle 110A, 110B such as starting and stopping the autonomous vehicle 110A, 110B, inputting a desired path, etc. The operator interface 152A, 152B, for example, may enable the operator to input parameters that cause the controller 150A, 150B to adjust the drivable path plan. For example, the operator may provide an input requesting that the desired path be acquired as quickly as possible, that an off-path normal error be minimized, that a speed of the autonomous vehicle 110A, 110B remain within certain limits, that a lateral acceleration experienced by the autonomous vehicle 110A, 110B remain within certain limits, etc. In addition, the operator interface 152A, 152B (e.g., via the display 172A, 172B, or via an audio system (not shown), etc.) may alert an operator if the desired path cannot be achieved, for example.

The control functions of the control system 140A, 140B may be performed by controller 150A, 150B of the control system 140A, 140B. A first transceiver 178A positioned on the autonomous vehicle 110A may output signals indicative of vehicle characteristics (e.g., position, speed, heading, curvature rate, curvature rate limits, maximum turning rate, minimum turning radius, steering angle, roll, pitch, rotational rates, acceleration, etc.) to a second transceiver 178B positioned on the autonomous vehicle 110B. The second transceiver 178B positioned on the autonomous vehicle 110B may output signals indicative of vehicle characteristics (e.g., position, speed, heading, curvature rate, curvature rate limits, maximum turning rate, minimum turning radius, steering angle, roll, pitch, rotational rates, acceleration, etc.) to the first transceiver 178A positioned on the autonomous vehicle 110A. The controller 150A, 150B, for example, may calculate drivable path plans and/or output control signals to control the curvature rate control system 160A, 160A, the speed control system 146A, 146B, and/or the implement control system 148A, 148B to direct the autonomous vehicle 110A, 110B toward the desired path, for example.

Figure 2:
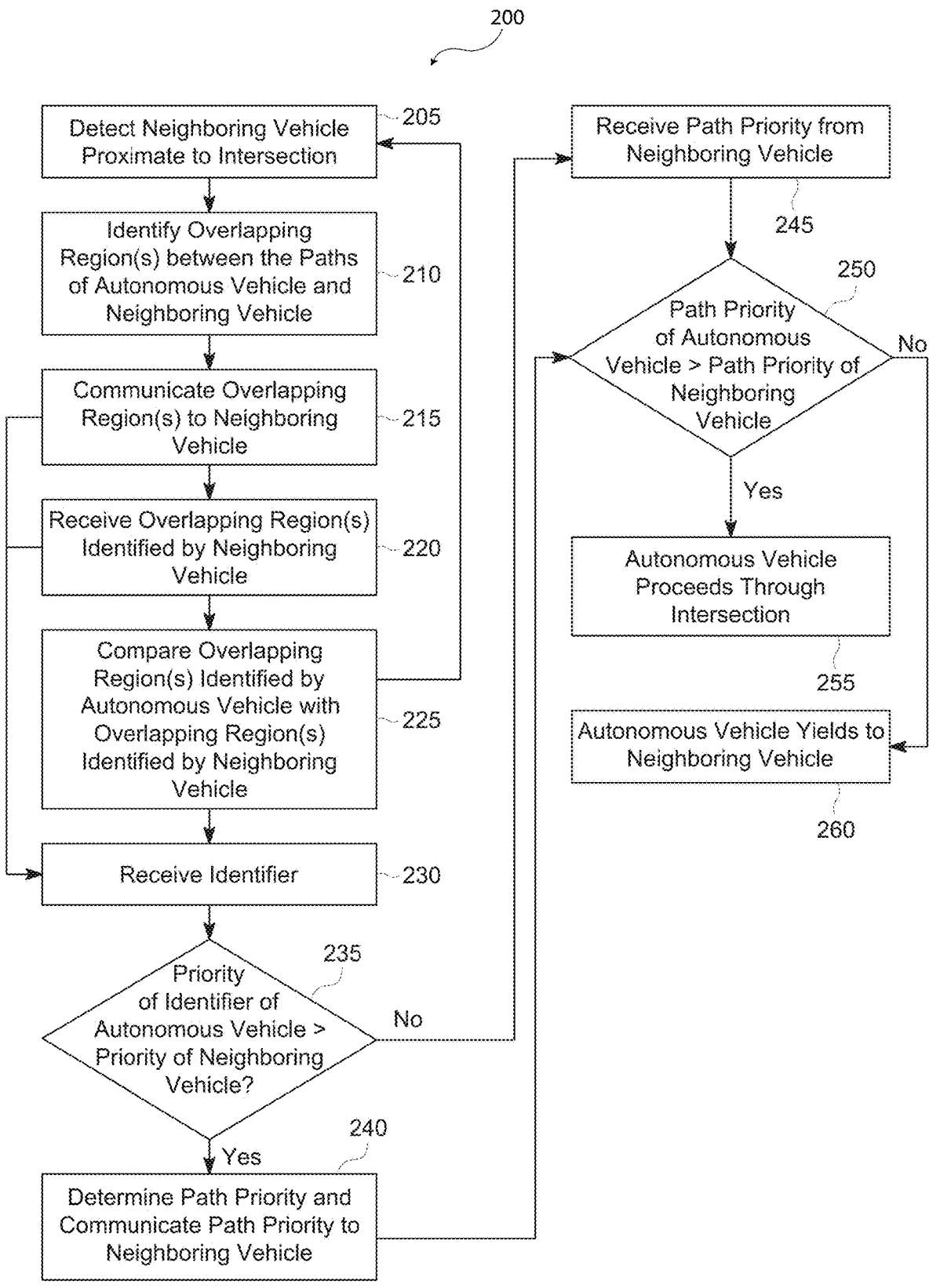
FIG. 2 is a flowchart of an intersection priority detection and response process performed by the automated driving system.

FIG. 2 is a flowchart of an intersection priority detection and response process performed by the automated driving system. Process 200 may be executed in part by control system 140A or 140B//.

Process 200 starts at block 205. At block 205, the obstacle detection subsystem of the autonomous vehicle 110A detects a neighboring autonomous vehicle 110B proximate to an intersection. The obstacle detection subsystem, for example, may detect a neighboring autonomous vehicle 110B and an intersection 330 using one or more sensors from sensor array 179A. The obstacle detection subsystem may receive data from any detected neighboring autonomous vehicle(s) proximate to an intersection. Such data may include position, orientation, velocity, and planned path of the neighboring autonomous vehicle(s). In some cases, the obstacle detection subsystem may detect such data instead of receiving the data. The obstacle detection subsystem may include one or more algorithms, programs, or routines that are executed by control system 140A. Any number or type of obstacle detection algorithms or subsystems may be used. The data may be received through transceiver 178A or a different transceiver that is part of the autonomous vehicle 110A. In some cases, the obstacle avoidance subsystem may receive input about a neighboring autonomous vehicle 110B or an intersection and may send commands to the speed control system 146A that the autonomous vehicle 110A must be stopped before the intersection.

Figure 3:
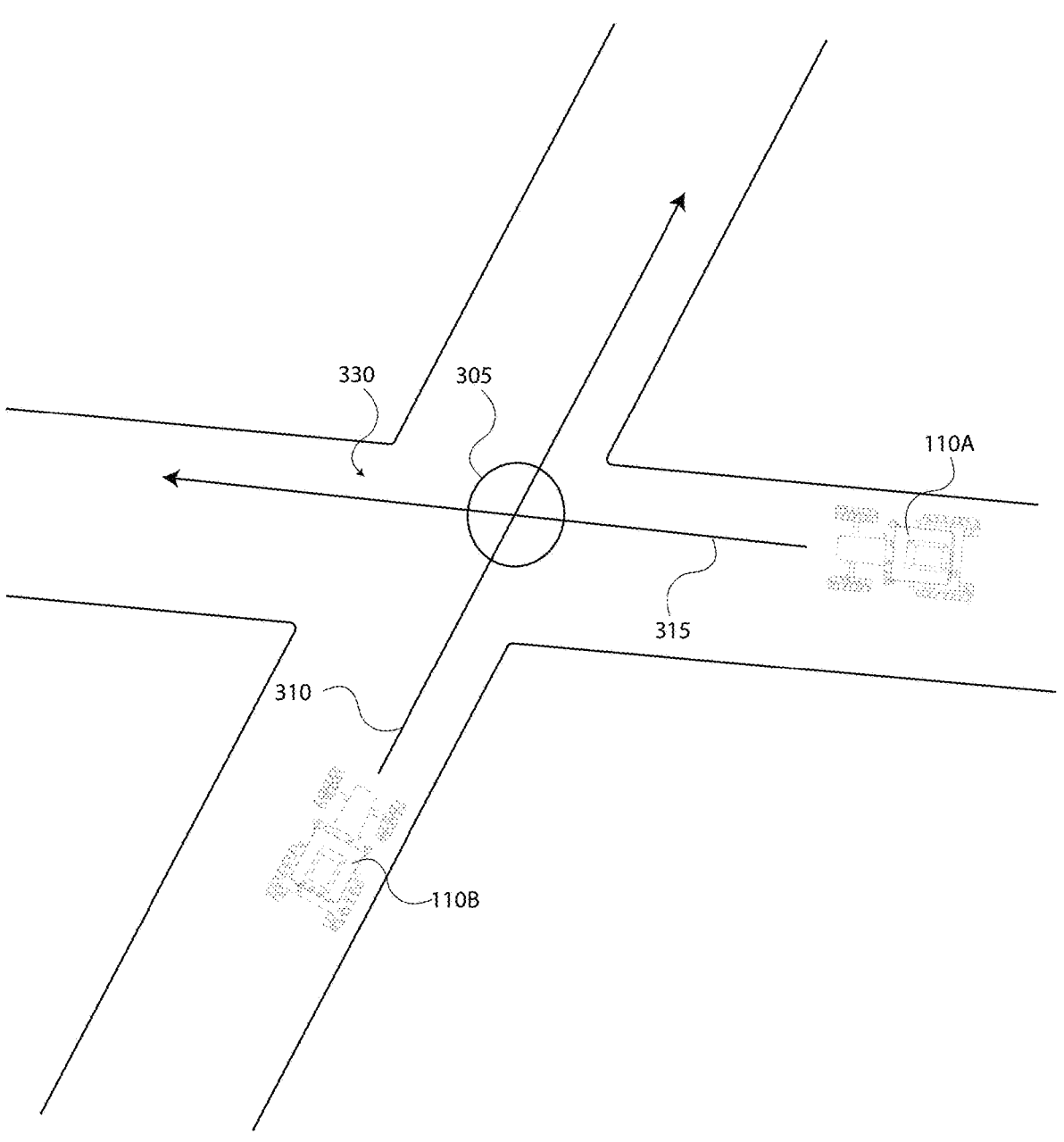
FIG. 3 is a diagram of two autonomous vehicles approaching an intersection.

At block 210, the obstacle detection subsystem may detect one or more obstacles by identifying one or more overlapping regions 305 (e.g., at or near an intersection 330 as shown in FIG. 3) between the planned path 315 of the autonomous vehicle 110A and the planned path 310 of the neighboring autonomous vehicle 110B proximate to an intersection. The obstacle detection subsystem may estimate the position and orientation of the autonomous vehicle 110A relative to any neighboring autonomous vehicle(s) 110B near the intersection 330 or at or near overlapping paths based on data from one or more of the sensors in the sensor array 179A, for example, position, orientation, velocity, and planned path of the autonomous vehicle 110A and data received from the neighboring autonomous vehicle(s).

The obstacle detection subsystem, for example, may output a signal representing the data. And the obstacle avoidance subsystem may receive the signal about obstacle(s) or overlapping region(s) 305. The obstacle avoidance subsystem, for example, may determine whether the obstacle(s) or overlapping region(s) 305 cannot be avoided at current conditions (e.g., position, orientation, velocity, and/or planned path of vehicles proximate to the intersection). The obstacle avoidance subsystem may determine that the obstacle(s) or overlapping region(s) 305 cannot be avoided, and, if so, the obstacle avoidance subsystem may send commands to the speed control system 146A that the autonomous vehicle 110A must be stopped before the intersection.

The obstacle avoidance subsystem may include one or more algorithms, programs, or routines that are executed by control system 140A. Any number or type of obstacle avoidance algorithms or subsystems may be used. The obstacle detection and the obstacle avoidance subsystems may be part of the same subsystem.

At block 215, the obstacle detection subsystem may communicate any identified overlapping region(s) 305 to any neighboring autonomous vehicle(s) 110B. The data may be communicated through transceiver 178A or a different transceiver that is part of the autonomous vehicle 110A.

In some embodiments, the autonomous vehicle 110A may or may not be able to communicate the overlapping region(s) 305 to the neighboring autonomous vehicle(s) 110B. If the autonomous vehicle 110A is not able to communicate overlapping region(s) 305 to the neighboring autonomous vehicle(s) 110B, the process may skip to block 230.

At block 220, the obstacle detection subsystem may receive data on any obstacle(s) or overlapping region(s) 305 identified by neighboring autonomous vehicle(s) 110B. The process may then proceed to block 225. If the autonomous vehicle 110A does not receive data from neighboring autonomous vehicle(s) 110B, the process may skip to block 230.

At block 225, the obstacle detection subsystem may compare its identification of the overlapping region(s) with the overlapping region(s) identified by neighboring autonomous vehicle(s) 110B to verify that they substantially match, for example, in size, shape, and position. If there is a mismatch in the overlapping region(s) 305 identified by the autonomous vehicle 110A and the overlapping region(s) identified by the neighboring autonomous vehicle(s) 110B, the process may return to block 205. In some cases, the mismatch may be communicated to the obstacle avoidance system of both the autonomous vehicle 110A and neighboring autonomous vehicle 110B, which may send a stop command to the steering control of both the autonomous vehicle 110A and neighboring autonomous vehicle 110B so both autonomous vehicle 110A and neighboring autonomous vehicle 110B stop before the intersection.

At block 230, after the obstacle avoidance subsystem receives a signal indicating the presence of overlapping region(s) 305, the autonomous vehicle 110A may communicate its assigned priority identifier. The priority identifier, for example, may be assigned to the autonomous vehicle at manufacturing, when the autonomous vehicle is introduced to worksite, or at the beginning of each day, or assigned by a user. The priority identifier, for example, may be static or dynamic. The priority identifier may be used to indefinitely identify the autonomous vehicle (e.g., a statically assigned priority identifier for an autonomous vehicle does not change). Each autonomous vehicle, for example, known at the work site may have a unique priority identifier (e.g., no autonomous vehicle has the same priority identifier). Each autonomous vehicle known at the work site may have a comparable priority identifier (e.g., all autonomous vehicles known at the work site may have a priority identifier that is in the same category of priority identifiers, such as all autonomous vehicles have numerical priority identifiers). The priority identifier may be numerical, alphabetical, alphanumeric, or other priority identifiers that can be used to signify priority.

As another example, the priority identifier may be randomly assigned to the autonomous vehicle at any times (e.g., daily, weekly, monthly, at implementation, at delivery, etc.). The autonomous vehicle may be equipped with a random number generator that may select a number through, for example, a sortition or random process. The random number generator may be part of the obstacle avoidance subsystem. In some cases, for example, the priority identifier may be based on external factors, such as based on the order of the vehicles closest to an intersection, a vehicle identification number (VIN), etc. In some cases, for example, if the autonomous vehicle is not able to communicate overlapping region(s) 305 to the neighboring autonomous vehicle(s) or does not receive overlapping region(s) 305 from neighboring autonomous vehicle(s), the autonomous vehicle may be designated as the authority by receiving the highest priority identifier (e.g., 1).

At block 235, the priority of the priority identifier received at block 230 is compared to the priority of the priority identifier of the neighboring autonomous vehicle(s). For example, the autonomous vehicle 110A and the neighboring autonomous vehicle(s) 110B may each receive numerical priority identifiers, and the priority of the numerical priority identifiers may be determined. In some cases, the vehicle with the lowest numerical priority identifier may have greater priority than vehicle(s) with higher numerical priority identifiers and be designated as the authority for resolving the intersection. In some cases, all the vehicles may communicate their priority identifiers with each other and acknowledge the vehicle with the lowest numerical priority identifier as the authority. In some cases, the autonomous vehicle is designated as the authority if a neighboring autonomous vehicle is not responsive, for example, not communicating data (e.g., position, orientation, planned path, overlapping region(s) 305.

At block 240, if the autonomous vehicle 110A has a priority identifier of greater priority than the neighboring autonomous vehicle(s) 110B, for example, the lowest numerical priority identifier, then the autonomous vehicle 110A is designated as the authority for resolving the intersection by determining whether the path 315 of the autonomous vehicle 110A or the path 310 of the neighboring autonomous vehicle 110B has greater priority and communicating the path priority to the neighboring autonomous vehicle(s) 110B.

At block 245, if the priority of the priority identifier of the autonomous vehicle 110A is lower than the priority of the neighboring autonomous vehicle 110B, the autonomous vehicle 110A receives the path priority determined by the neighboring autonomous vehicle 110B as the authority. In some embodiments, the priority of the autonomous vehicle may be determined based on which autonomous vehicle has the higher priority.

At block 250, the authority, which may be the autonomous vehicle 110A or a neighboring autonomous vehicle 110B, determines whether the path priority of the autonomous vehicle is greater than the path priority of the neighboring autonomous vehicle. The authority selects a single vehicle with the priority to proceed through the intersection. The authority may select a vehicle to proceed through the intersection first based on any of a number of factors such as, for example, the autonomous vehicle with the highest (or lowest) priority, the autonomous vehicle estimated to reach the intersection first, or the autonomous vehicle closest to the intersection may proceed through the intersection before other vehicles. In some cases, if, for example, the neighboring autonomous vehicle may not be responsive, the autonomous vehicle and the neighboring autonomous vehicle may be required to enforce existing stopping commands so both or all vehicles must stop before an intersection as a fail-safe state.

At block 255, if the authority decides that the autonomous vehicle 110A should proceed through the intersection before the neighboring autonomous vehicle 110B, the decision is communicated to the autonomous vehicle 110A and the neighboring autonomous vehicle(s) 110B. The autonomous vehicle 110A is allowed to stop treating the overlapping region as an obstacle while it proceeds through the intersection 330, and the neighboring autonomous vehicle 110B is required to enforce existing stopping or reduction of speed commands.

At block 260, if the authority decides that the autonomous vehicle 110A should yield to the neighboring autonomous vehicle 110B, the decision is communicated to the autonomous vehicle 110A and the neighboring autonomous vehicle(s) 110B. The neighboring autonomous vehicle is allowed to stop treating the overlapping region as an obstacle, and the autonomous vehicle is required to enforce existing stopping or reduction of speed commands. In some cases, for example, the neighboring autonomous vehicle may not be responsive, the autonomous vehicle may automatically yield to the neighboring autonomous vehicle as a default.

Figure 4:
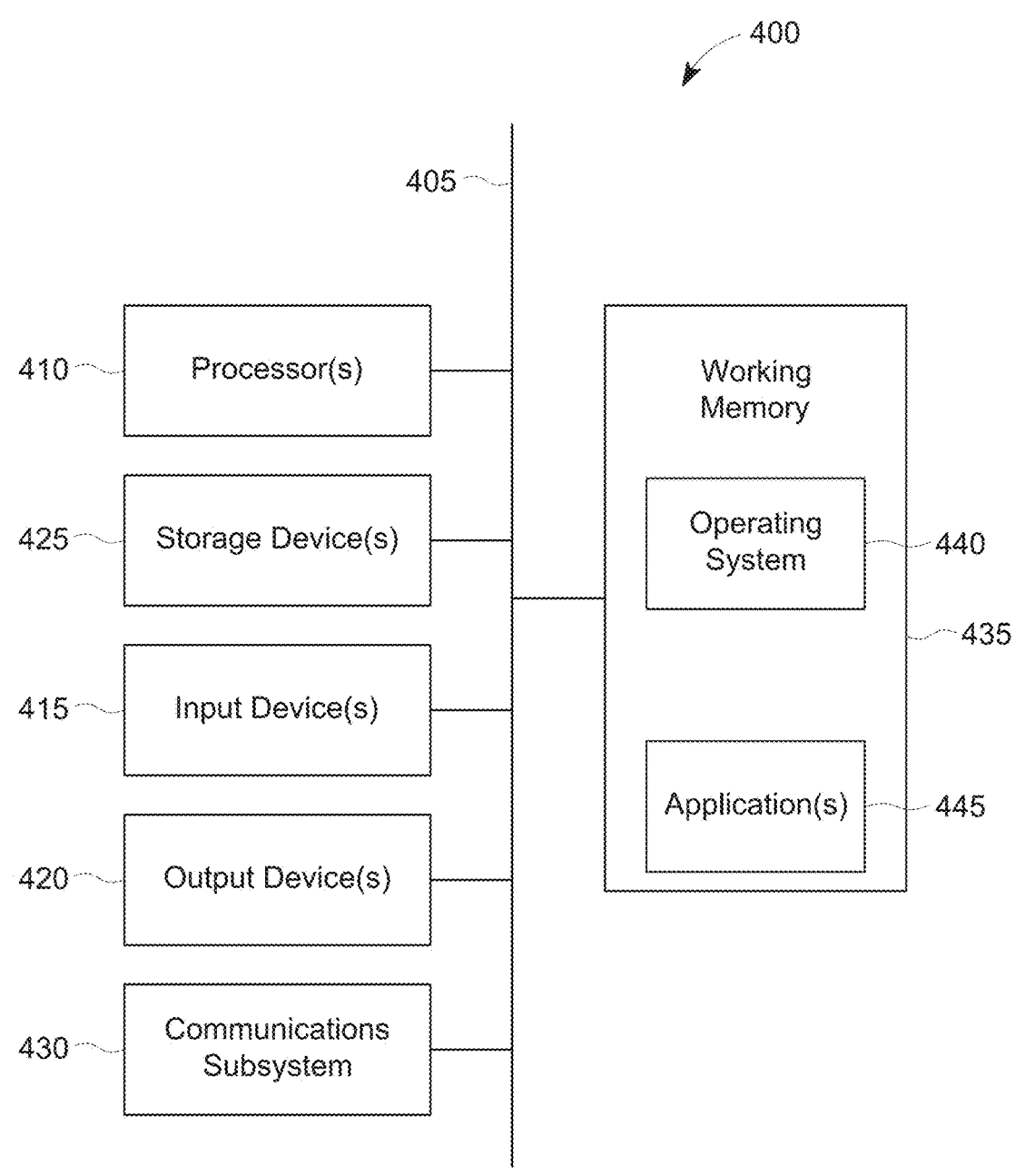
FIG. 4 is a block diagram of a computational system that can be used to perform some embodiments described in this document.

The computational system 400, shown in FIG. 4 can be used to perform any of the embodiments of the invention. For example, computational system 400 can be used to execute process 200 at autonomous vehicle 110A or neighboring autonomous vehicle 110B. As another example, computational system 400 can perform any calculation, identification and/or determination described here. Computational system 400 includes hardware elements that can be electrically coupled via a bus 405 (or may otherwise be in communication, as appropriate). The hardware elements can include one or more processors 410, including without limitation one or more general-purpose processors and/or one or more special-purpose processors (such as digital signal processing chips, graphics acceleration chips, and/or the like); one or more input devices 415, which can include without limitation a mouse, a keyboard and/or the like; and one or more output devices 420, which can include without limitation a display device, a printer and/or the like.

The computational system 400 may further include (and/or be in communication with) one or more storage devices 425, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 400 might also include a communications subsystem 430, which can include without limitation a modem, a network card (wireless or wired), an infrared communication device, a wireless communication device and/or chipset (such as a Bluetooth device, an 802.6 device, a Wi-Fi device, a WiMax device, cellular communication facilities, etc.), and/or the like. The communications subsystem 430 may permit data to be exchanged with a network (such as the network described below, to name one example), and/or any other devices described in this document. In many embodiments, the computational system 400 will further include a working memory 435, which can include a RAM or ROM device, as described above.

The computational system 400 also can include software elements, shown as being currently located within the working memory 435, including an operating system 440 and/or other code, such as one or more application programs 445, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 425 described above.

In some cases, the storage medium might be incorporated within the computational system 400 or in communication with the computational system 400. In other embodiments, the storage medium might be separate from a computational system 400 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 400 and/or might take the form of source and/or installable code, which, upon compilation and/or installation on the computational system 400 (e.g., using any of a variety of generally available compilers, installation programs, compression/decompression utilities, etc.) then takes the form of executable code.

Unless otherwise specified, the term "substantially" means within 5% or 10% of the value referred to or within manufacturing tolerances. Unless otherwise specified, the term "about" means within 5% or 10% of the value referred to or within manufacturing tolerances.

The conjunction "or" is inclusive.

The terms "first", "second", "third", etc. are used to distinguish respective elements and are not used to denote a particular order of those elements unless otherwise specified or order is explicitly described or required.

Numerous specific details are set forth to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained in software to be used in programming or configuring a computing device.

Embodiments of the methods disclosed may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A method executing at an autonomous vehicle on a first path and having a first priority identifier, the method comprising:

detecting a neighboring autonomous vehicle on a second path;

identifying a first overlapping region between the first path and the second path;

sending the first priority identifier to the neighboring autonomous vehicle;

receiving a second priority identifier from the neighboring autonomous vehicle;

in the event the first priority identifier has greater priority over the second priority identifier, deciding whether the autonomous vehicle or the neighboring autonomous vehicle proceeds through the intersection first in a first decision and communicating the first decision to the neighboring autonomous vehicle, or in the event the first priority identifier has lesser priority over the second priority identifier assigned to the neighboring autonomous vehicle, receiving a second decision from the neighboring autonomous vehicle as to whether the autonomous vehicle or the neighboring autonomous vehicle proceeds through the intersection first; and in response to the first decision or the second decision, operating the autonomous vehicle to proceed along the first path through the overlapping region or yield to the neighboring autonomous vehicle proceeding through the overlapping region.

2. The method according to claim 1, wherein:

the first priority identifier is a first numerical priority identifier and the second priority identifier is a second numerical priority identifier, wherein if the first numerical priority identifier is less than the second numerical priority identifier, determining the first numerical priority identifier has greater priority over the second numerical priority identifier, or if the first numerical priority identifier is greater than the second numerical priority identifier, determining the first numerical priority identifier has lesser priority over the first numerical priority identifier.

3. The method according to claim 1, further comprising:

communicating the first overlapping region identified by the autonomous vehicle to the neighboring autonomous vehicle;

receiving a second overlapping region between the first path and the second path identified by the neighboring autonomous vehicle; and comparing the first overlapping region and the second overlapping region to determine whether the first overlapping region substantially matches the second overlapping region.

4. The method according to claim 1, further comprising:

receiving data from the neighboring autonomous vehicle, the data comprising a position of the neighboring autonomous vehicle, an orientation of the neighboring autonomous vehicle, and/or a velocity of the neighboring autonomous vehicle.

5. The method according to claim 1, wherein the overlapping region is substantially proximate an intersection of the first path and the second path.

6. The method according to claim 1, wherein the first path and the second path are located within an agricultural work site.

7. The method according to claim 1, wherein the first path and the second path are located within a cargo yard.

8. The method according to claim 1, wherein detecting a neighboring autonomous vehicle on a second path, further comprises receiving information defining the second path from the second autonomous vehicle.

9. An autonomous vehicle comprising:

a sensor array that produces sensor data;

a transceiver that communicates with and receives data from a neighboring autonomous vehicle on a second path proximate to the intersection;

a speed control system that controls the speed of the autonomous vehicle;

a steering control system that controls the steering of the autonomous vehicle;

a memory storing a first priority identifier; and a controller communicatively coupled with the sensor array, the transceiver, the speed control system, the steering control system, and the memory, the controller:

directs the autonomous vehicle along a first path using the speed control systema and the steering control system;

detects a neighboring autonomous vehicle using the transceiver and/or the sensor array, wherein the neighboring autonomous vehicle is on a second path that substantially intersects with the first path;

identifies a first overlapping region between the first path and the second path;

communicates the first overlapping region identified by the autonomous vehicle to the neighboring autonomous vehicle via the transceiver;

if the first priority identifier has greater priority over a second priority identifier assigned to the neighboring autonomous vehicle, designates as an authority to decide whether the autonomous vehicle or the neighboring autonomous vehicle proceeds through the intersection first in a first decision and communicates the first decision to the neighboring autonomous vehicle, or if the first priority identifier has lesser priority over the second priority identifier assigned to the neighboring autonomous vehicle, receives a second decision from the neighboring autonomous vehicle as to whether the autonomous vehicle or the neighboring autonomous vehicle proceeds through the intersection first; and in response to the first decision or the second decision, sends commands to the steering control system and the speed control system that when executed move the autonomous vehicle to proceed through the intersection or yield to the neighboring autonomous vehicle proceeding through the intersection.

10. The autonomous vehicle according to claim 9, wherein the autonomous vehicle is a tractor and the first path is within an agricultural field.

11. The autonomous vehicle according to claim 9, wherein the autonomous vehicle is a yard truck and the first path is within cargo yard.

12. The autonomous vehicle according to claim 9, wherein:

the first priority identifier is a first numerical priority identifier and the second priority identifier is a second numerical priority identifier, wherein if the first numerical priority identifier is less than the second numerical priority identifier, determining the first numerical priority identifier has greater priority over the second numerical priority identifier, or if the first numerical priority identifier is greater than the second numerical priority identifier, determining the first numerical priority identifier has lesser priority over the first numerical priority identifier.

13. The autonomous vehicle according to claim 9, wherein the controller further:

communicates the first overlapping region identified by the autonomous vehicle to the neighboring autonomous vehicle;

receives a second overlapping region between the first path and the second path identified by the neighboring autonomous vehicle; and compares the first overlapping region and the second overlapping region to determine whether the first overlapping region substantially matches the second overlapping region.

14. The autonomous vehicle according to claim 9, further comprising:

receiving data from the neighboring autonomous vehicle, the data comprising a position of the neighboring autonomous vehicle, an orientation of the neighboring autonomous vehicle, and/or a velocity of the neighboring autonomous vehicle.

15. The autonomous vehicle according to claim 9, wherein the overlapping region is substantially proximate an intersection of the first path and the second path.

16. The autonomous vehicle according to claim 9, wherein sensor array comprises at least one of the following: an infrared sensor, an ultrasonic sensor, a magnetic sensor, a radar sensor, a lidar sensor, a terahertz sensor, a sonar sensors, and a camera.

17. The autonomous vehicle according to claim 9, wherein detecting a neighboring autonomous vehicle on a second path, further comprises receiving information defining the second path from the second autonomous vehicle via the transceiver.

18. A non-transitory computer readable medium having instructions stored thereon for performing a method of:

directing an autonomous vehicle along a first path;

detecting a neighboring autonomous vehicle on a second path from sensor data and/or from transceiver data;

identifying a first overlapping region between the first path and the second path;

sending the first priority identifier to the neighboring autonomous vehicle;

receiving a second priority identifier from the neighboring autonomous vehicle;

in the event the first priority identifier has greater priority over the second priority identifier, deciding whether the autonomous vehicle or the neighboring autonomous vehicle proceeds through the intersection first in a first decision and communicating the first decision to the neighboring autonomous vehicle, or in the event the first priority identifier has lesser priority over the second priority identifier assigned to the neighboring autonomous vehicle, receiving a second decision from the neighboring autonomous vehicle as to whether the autonomous vehicle or the neighboring autonomous vehicle proceeds through the intersection first; and in response to the first decision or the second decision, operating the autonomous vehicle to proceed along the first path through the overlapping region or yield to the neighboring autonomous vehicle proceeding through the overlapping region.

19. The non-transitory computer readable medium to claim 18, wherein the method further comprises:

communicating the first overlapping region identified by the autonomous vehicle to the neighboring autonomous vehicle;

receiving a second overlapping region between the first path and the second path identified by the neighboring autonomous vehicle; and comparing the first overlapping region and the second overlapping region to determine whether the first overlapping region substantially matches the second overlapping region.

20. The non-transitory computer readable medium to claim 18, wherein the method further comprises:

receiving data from the neighboring autonomous vehicle, the data comprising a position of the neighboring autonomous vehicle, an orientation of the neighboring autonomous vehicle, and/or a velocity of the neighboring autonomous vehicle.

* * * * *